United States Patent [19]

Hayashi

[11] Patent Number: 5,405,635
[45] Date of Patent: Apr. 11, 1995

[54] METHOD OF PREPARING PRESSURE-TREATED RICE

[75] Inventor: Rikimaru Hayashi, Uji, Japan, 4
[73] Assignee: Tadashi Inoue, Hashimoto, Japan
[21] Appl. No.: 679,088
[22] PCT Filed: May 1, 1990
[86] PCT No.: PCT/JP90/00576
 § 371 Date: Sep. 8, 1992
 § 102(e) Date: Sep. 8, 1992
[87] PCT Pub. No.: WO91/02464
 PCT Pub. Date: Mar. 7, 1991

[30] Foreign Application Priority Data

Aug. 22, 1989 [JP] Japan .................. 1-216743

[51] Int. Cl.⁶ ............................... A23B 9/00
[52] U.S. Cl. ...................... 426/462; 426/507
[58] Field of Search .............. 426/507, 459, 462

[56] References Cited

U.S. PATENT DOCUMENTS

4,952,416  8/1990  Abraham et al. ............... 426/459

FOREIGN PATENT DOCUMENTS

56-72655  6/1981  Japan .
64-13955  1/1989  Japan .

OTHER PUBLICATIONS

Foods and Their Developments, No. 12, vol. 23, 1988, "Process Reservation Sterilization of Foods with Use of a High Pressure–Present Status and View", Rikimaru Hayashi, pp. 40–45.
Food Processing Machinery, No. 2, vol. 25, 1988, "Use of a High Pressure in Food Industry", Rikimaru Hayashi, pp. 53–59.
Starch Science, No. 3, vol. 34, 1987, "Use of Phenomena under a High Pressure in Food Processing (4): Digestion of Amylase in a High Pressure Treated Starch", Hayashi et al., p. 261.
Chemistry and Organisms, No. 11, vol. 25, 1987, "Seeking for Possibility of Use of a High Pressure in the Food Processing Field—Various Uses for Cooking, Processing, Reservation, etc, likewise Heat".
Hayashi et al., "Application of High Pressure to Food Processing: . . . ", Agric. Biol. Chem., 53(11), 2935–2939, 1989.
Okamoto et al., "Application of High Pressure to Food Processing: . . . " Agric. Biol. Chem. 54(1), 183–189, 1990.
Hayashi, "Application of High Pressure to Food Processing and Preservation: . . . ", Engineering and Food, vol. 2, pp. 815–826, 1989.
Hayashi et al., "Increased Amylase Digestibility of Pressure—Treated Starch", Agric. Biol. Chem., 53(9), 2543–2544, 1989.

*Primary Examiner*—George Yeung
*Attorney, Agent, or Firm*—Larson and Taylor

[57] ABSTRACT

The present invention provides a method of preparing pressure-treated rice characterized by placing washed polished rice directly or as enclosed in a container into a liquid within a pressure chamber and applying a high pressure to the pressure chamber for a suitable period of time, and a container for cooking the pressure-treated rice in a microwave oven characterized in that the cooking container comprises a container body, a closure for the container body, and a partition provided inside the container body, the partition having a multiplicity of steam ports and being disposed in the interior of the container body for dividing the interior into an upper portion for accommodating the rice therein and a lower portion for accommodating therein water for steaming the rice. The method readily affords the pressure-treated rice, which can be cooked to a state suited to eating when heated for a short period of time with a reduced likelihood of impairing the flavor, taste and nutrients. The container permits a microwave oven to boil and steam the rice effectively by heating to cook the rice satisfactorily within a very short period of time.

5 Claims, 6 Drawing Sheets

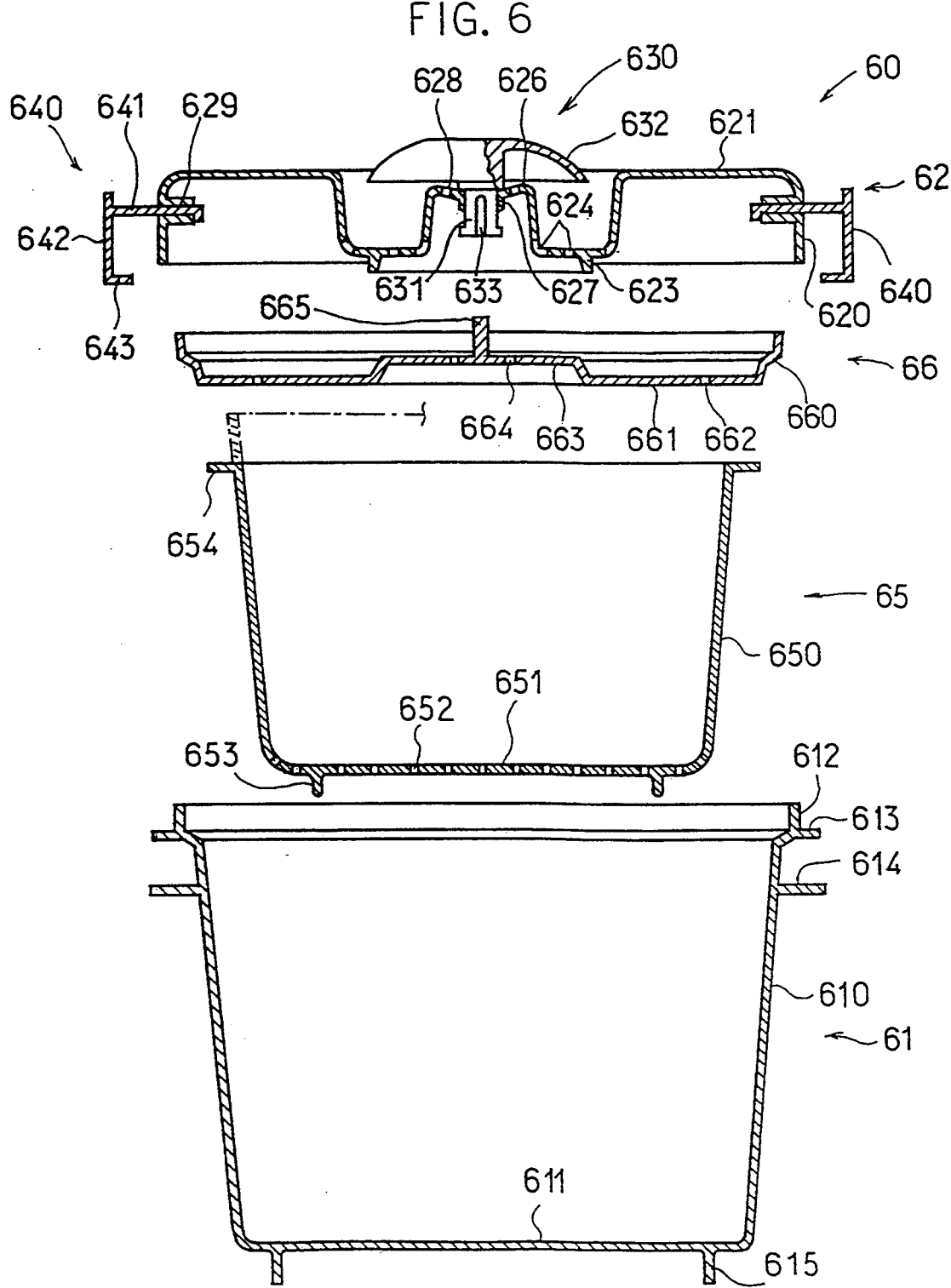

METHOD OF PREPARING PRESSURE-TREATED RICE

FIELD OF INDUSTRIAL APPLICATION

The present invention relates to a method of preparing pressure-treated rice and containers for cooking the rice in a microwave oven.

PRIOR ART AND PROBLEMS INVOLVED

When to be eaten, rice must usually be treated by the following steps.
a. Washing
b. Steeping
c. Boiling
d. Standing as boiled Rice is washed in the washing step a., and water is allowed to fully penetrate into the rice in the steeping step b. These steps require about one hour. The boiling step c. and the step d. of allowing the rice to stand as boiled require about 50 minutes. Thus, the entire process takes about 1 hour and 50 minutes.

Accordingly, the cooking process requires much labor and time before eating and is cumbersome especially to unmarried persons. Rice could be cooked in a shortened period of time by omitting the step b. of steeping and the step d. of standing, but this is usually undesirable since the rice would then taste very poor.

To ensure savings in labor and time for cooking rice, rice is retorted or otherwise processed and prepared as enclosed, for example, in pouches. More specifically, rice is cooked by the steps a. to d. and enclosed in packets in units of one to several meals. When purchased and heated again in a household microwave oven, the processed rice is ready for eating. The rice can therefore be cooked with reduced labor in a shortened period of time. However such processed food is preserved after having been heated and needs to be heated again for eating. This not only results in a greatly impaired taste but also seriously breaks down nutrients such as vitamins and calcium.

SUMMARY OF THE INVENTION

An object of the present invention is to overcome these problems of the prior art and to provide a method of preparing rice which is eatable with reduced labor and time and which is so treated as not to impair the taste, flavor and nutrients, the invention further providing utensils needed for the preparation.

To fulfill the above object, the present invention provides a method of preparing pressure-treated rice characterized by placing washed polished rice into water within a pressure chamber and applying a high pressure to the pressure chamber for a suitable period of time.

The present invention further provides a method of preparing pressure-treated rice characterized by placing washed polished rice into an enclosing container along with a suitable amount of water and hermetically sealing off the container with air removed from its interior, immersing the container into a liquid, and applying a high pressure to the liquid for a suitable period of time to subject the container in the liquid to the pressure uniformly from outside.

The present invention also provides a container for cooking pressure-treated rice in a microwave oven characterized in that the cooking container comprises a container body, a closure for the container body, and a partition provided inside the container body, the partition having a multiplicity of steam ports and being disposed in the interior of the container body for dividing the interior into an upper portion for accommodating the rice therein and a lower portion for accommodating therein water for steaming the rice.

In the method of the present invention for preparing pressure-treated rice, washed polished rice is placed into water within a pressure chamber, which is then subjected to a high pressure for a suitable period of time, or washed polished rice and a suitable amount of water are placed into an enclosing container, which is then hermetically sealed off with air removed from inside the container and immersed in a liquid, followed by application of a high pressure to the liquid for a suitable period of time, so that the high pressure applied for the suitable period of time denatures the polished rice as a characteristic effect of the high pressure. (Denaturation under high pressure is described in detail in "High Pressure Use in Food," published by San-Ei Shuppan Co., on Jul. 15, 1989.) The denaturation breaks down the three-dimensional molecular structure of raw starch, rendering the starch readily decomposable. The denatured rice is not greatly different from usual polished rice in appearance, has high hardness and is more similar to uncooked polished rice than cooked rice. Since the pressure applied acts on the rice throughout its interior instantaneously, the rice is denatured substantially uniformly in its entirety including the interior of the grains. Especially because rice must be cooked thoroughly without leaving any uncooked interior portion, the pressure treatment is more advantageous than the heat treatment which requires some time for the heat to reach the inner portion of the grains from the surface. In the case where polished rice is placed into water within the pressure chamber, which is then subjected to a high pressure for the preparation of the treated rice, the rice is placed directly into the pressure chamber, with the result that the rice can be treated by a simple procedure and can be dried easily after the pressure treatment. In the case where polished rice and water are placed into the enclosing container, which is then hermetically sealed off and immersed in a liquid for the application of high pressure, this method of preparation serves to prevent the contamination of the treated rice with bacteria or microorganisms. Further in this case, various liquids are usable for immersing the enclosing container therein. This is advantageous, for example, for inhibiting the corrosion of the inner surface of the pressure treatment apparatus.

Preferably, the pressure to be applied is not lower than 1000 atm to not higher than 9000 atm. At pressures lower than 1000 atm, sufficient denaturation will not take place, with the result that the treated rice fails to become suitable for eating when heated for a short period of time. Pressures exceeding 9000 atm necessitate a very great pressure apparatus, whereas it is not particularly desired to shorten the heating time more than is achievable by a pressure of 9000 atm. Further use of a pressure of at least 2000 atm serves to sterilize rice. The application of a pressure of at least 4000 atm inactivates the enzyme of rice, preventing rice from decaying inside the enclosing container and from producing a gas due to decay.

The container of the present invention for cooking the pressure-treated rice comprises a partition disposed within the container body and having a multiplicity of steam ports for dividing the interior of the container body into an upper portion for accommodating the rice therein and a lower portion for accommodating therein water for steaming the rice. When the container is heated in a microwave oven, therefore, the pressure-treated rice placed in the upper portion is boiled with boiling water present in the upper portion and thereafter steamed with the vapor released from the water remaining in the lower portion, whereby the treated rice is softened thoroughly within a short period of time owing to its unique nature.

The partition of the container is disposed inside the container body, preferably with its peripheral edge substantially in contact with or positioned close to the container body so as to restrict the flow of steam inside the container. This obviates the likelihood that the steam will escape through a clearance between the partition and the container body to reach the top portion of the container without coming into contact with the pressure-treated rice, whereby the rice can be steamed very effectively. Alternatively, the partition can be disposed inside the container body with the top edge thereof substantially in contact with or positioned close to the closure so as to restrict the flow of steam inside the container, whereby the same effect as above can be achieved.

Other objects and advantages of the present invention will become more apparent from the following description of embodiments with reference to the accompanying drawings.

BRIEF DESCRIPTION OF THE DRAWINGS

The drawings show the embodiments of the invention.

FIG. 4 to 6 are views in vertical section showing different containers for use in cooking the pressure-treated rice in a microwave oven.

EMBODIMENTS

Figure 1:
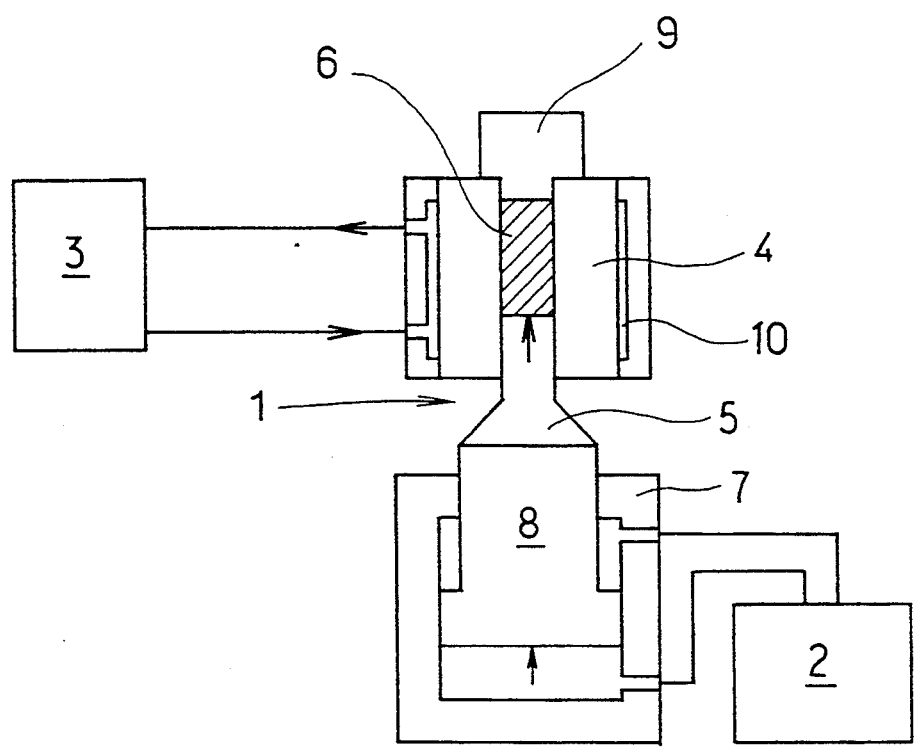
FIG. 1 is a diagram showing a pressure treatment apparatus for use in preparing pressure-treated rice.

The following description should be understood merely as describing some embodiments of the present invention. The present invention can be modified variously without departing from the scope thereof as defined in the appended claims.

First, a description will be given of two exemplary methods of preparing pressure-treated rice.

I. In the case where polished rice is placed directly into pressure chamber

Polished rice is treated by the following sequence of steps.
  a. Polished rice is washed and thereafter placed into water within a pressure chamber. The rice is washed in the same manner as when rice is cooked usually.
  b. For a suitable period of time, the pressure chamber is subjected to a high pressure which is in the foregoing range. The pressurizing time is usually 20 minutes to 50 minutes although varying with the hardness and like properties of the rice.
  c. After the application of pressure, the rice is withdrawn from the pressure chamber and dried in the air to remove the water deposited on the surface. This can be done at room temperature or in a hot atmosphere which will not affect the composition of the rice.
  d. When required, the pressure-treated rice is thereafter enclosed in containers in an amount of one meal (e.g. 140 g) to several meals or larger in each container. The containers can be bags, rigid plastics or metal cans or other suitable ones. It is advantageous to place the rice into the bag as evacuated to a vacuum or to place a deoxidizer thereinto along with the rice for the prevention of degradation of the rice with time.

II. In the case where polished rice and water are placed into enclosing container, followed by pressurization
  a. Polished rice is placed into a plurality of enclosing containers in an amount of one meal (e.g. 140 g) to several meals in each container, or a larger amount of polished rice is placed into one container.
  b. Water is poured into the container. To be suitable, the amount of water is about twice the volume of the rice.
  c. The air in the container is removed, and the container is sealed off. Preferably, the air is removed by inserting a tube connected to a vacuum pump into the container. Preferably, the container is sealed off at a portion thereof remoter from its one end than the tube.
  d. The container is immersed in hot water at 20° to 50° C. for about 10 minutes. This step permits water to penetrate into the rice with greater ease but can usually be omitted.
  e. The container is placed into a pressure chamber. The pressure chamber is filled with distilled water, a liquid containing antioxidant or some other suitable liquid for pressure treatment. The pressure to be applied and the pressurizing time are the same as in the first method. Although the pressurizing time can be shortened when the pressure liquid is used at 30° to 50° C., a satisfactory result is available usually at room temperature.
  f. After the application of pressure, the container is withdrawn from the pressure chamber. In this state, the water in the container has almost entirely penetrated into the grains of rice. When required, the surface of the container is dried to remove the liquid.

When the rice is placed directly into the pressure chamber or into the enclosing container in either of the above methods, chopped vegetables, meat, mushroom or the like can be suitably added to the rice, whereby the rice can be given improved taste and flavor when cooked.

Next, a pressure treatment apparatus for use in the above methods will be described. FIG. 1 schematically shows the apparatus. The pressure treatment apparatus comprises a pressurizing assembly 1, hydraulic unit 2, unit 3 for circulating water of constant temperature and water jacket 10. The pressurizing assembly 1 comprises a container side wall 4 and a container upper wall 9 which form a pressure chamber 6 inside thereof, a high-pressure piston 5 movable into and out of the pressure chamber 6, a low-pressure piston 8 positioned under and integral with the high-pressure piston 5, and a low-pressure cylinder 7 for driving the low-pressure piston 8.

For operation, the low-pressure piston 8 is urged upward inside the low-pressure cylinder 7 by the hydraulic unit 2. With this movement, the high-pressure piston 5 integral with the low-pressure piston 8 is also urged upward inside the pressure chamber 6. The high-pressure piston 5 thus urged gives an increased pressure to the pressure chamber 6 which is filled with water or pressure liquid. The internal pressure of the pressure chamber 6 is dependent on the ratio between the low-pressure piston 8 and the high-pressure piston 5 in the area to be subjected pressure, and the pressure of the hydraulic unit is amplified in corresponding relation with the ratio and applied to the pressure chamber. In the present example, the pressure is amplified ten times and a high pressure can be quickly produced. The container side wall 4 is surrounded by the water jacket 10, through which constant-temperature water from the water circulating unit 3 is circulated, so that the internal temperature of the pressure chamber 6 can be adjusted, for example, to about 60° C. by controlling the temperature of the circulating water.

Various other pressure treatment apparatus are usable which have a pressure chamber and adapted to exert a high pressure on a liquid in the pressure chamber.

Figure 2:
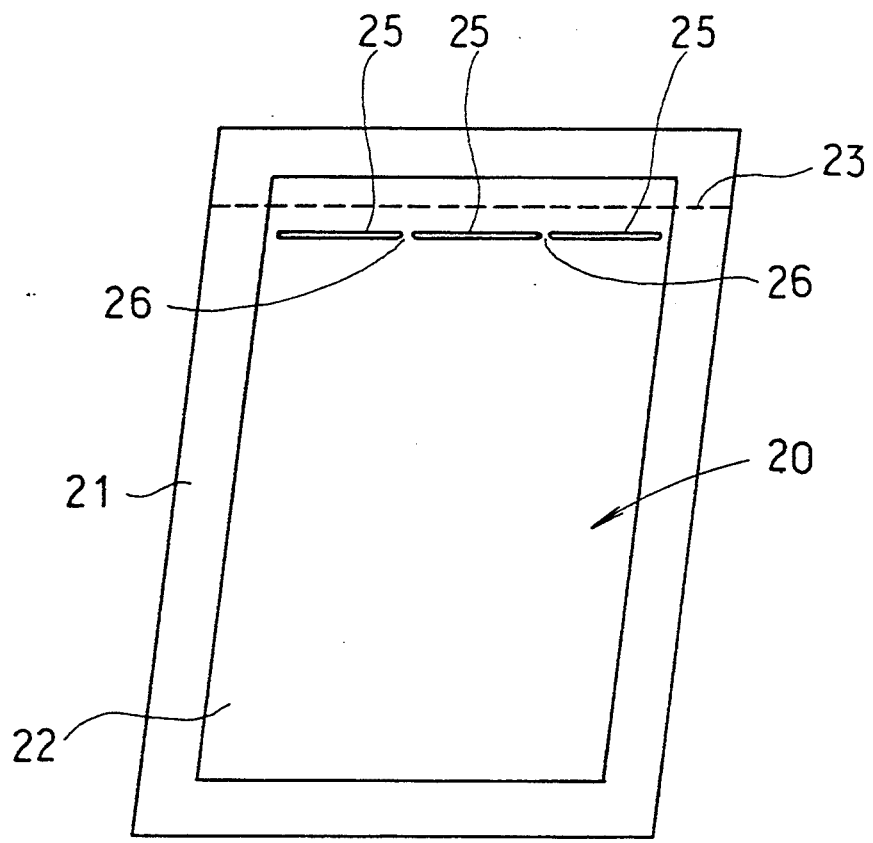
FIG. 2 is a perspective view of an enclosing container for use in preparing the pressure-treated rice.
Figure 3:
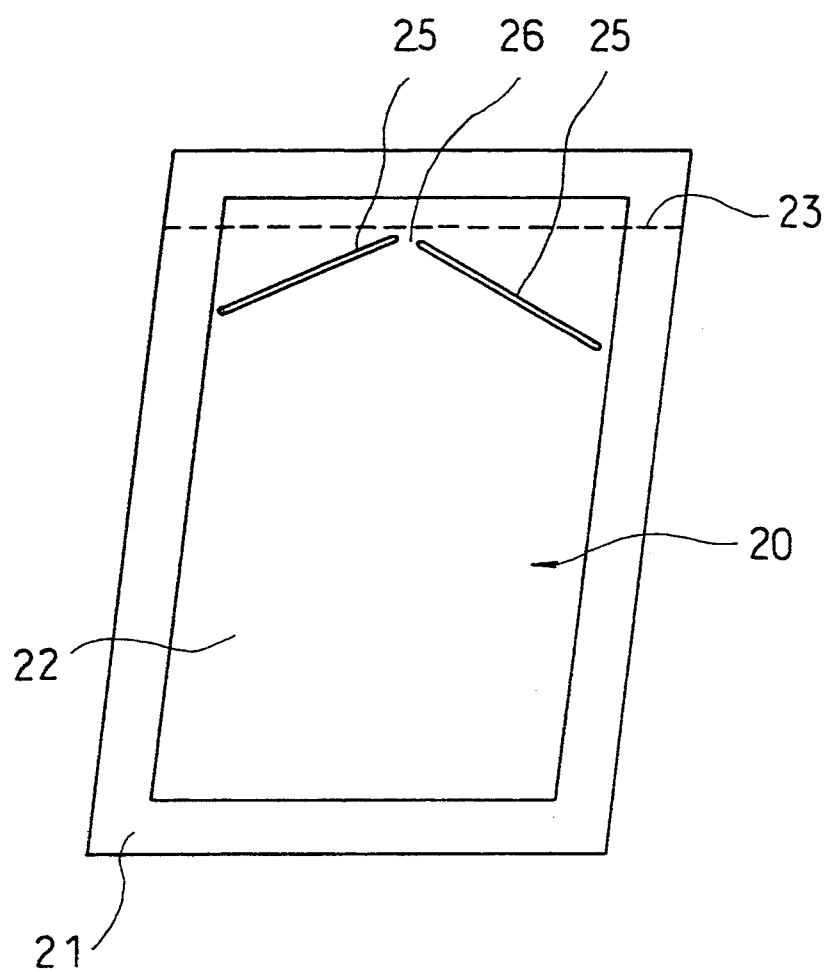
FIG. 3 is a perspective view showing another enclosing container.

FIGS. 2 and 3 show examples of enclosing containers in the form of a bag for accommodating the polished rice to be placed into the pressure chamber. The bag 20 of FIG. 2 is made of vinyl chloride or like usual material for enclosing containers and has a receptacle portion 22 surrounded by a sealed portion 21 formed by fusion, adhesion or otherwise. Formed immediately inwardly of one side of the sealed portion 21 is a linear thin-wall portion 23 for opening the bag. The thin-wall portion 23 can be of various forms, for example, in the form of a continuous line or broken line, or can be omitted. A partition portion 25 is provided inwardly of the thin-wall portion 23. The partition portion 25 is formed by joining together the opposed sheet portions of the container, for example, by fusion or adhesion in the form of a discrete line, with one or a plurality of minute spaces 26 left unjoined which are smaller than the grain size of the polished rice. The drawing shows the container as sealed along its entire periphery after the pressure-treated rice has been placed into the receptacle portion 22 with the sealed portion 21 partly left unclosed.

To cook the pressure-treated rice accommodated in the enclosing container, the linear thin-wall portion 23 is opened first. At this time, air is drawn into the vacuum within the container, whereas the rice will not be forced out by an air stream since the rice contained is separated by the partition portion 25. Next, the container is opened along the partition portion 25 or inside thereof to take out the rice. The rice and a suitable amount of water (for example, 1.5 to 1.6 times the volume of the rice) are thereafter placed into a pan or the like and heated in a microwave oven or with gas or electricity. The heating time required for cooking is about 5 to 7 minutes in the case of the microwave oven or about 10 to 12 minutes when gas or electricity is used for heating.

The bag 20 of FIG. 3 has a slanting partition portion 25 extending downward from a position immediately below the midpoint of a linear thin-wall portion 23 toward opposite sides. The bag thus constructed can be opened easily along the partition portion 25 by opening the thin-wall portion 23 and thereafter pulling apart the opposed sheet portions of the bag as held by the hands at the upper end of the partition portion. The partition portion 25 can be so formed that the upper end thereof extends to a position above the thin-wall portion 23. When the thin-wall portion 23 is opened in this case, a space corresponding to the minute space 26 is formed.

The partition portion 25 can be of various forms, for example, in the form of a curve or zigzag line.

Figure 4:
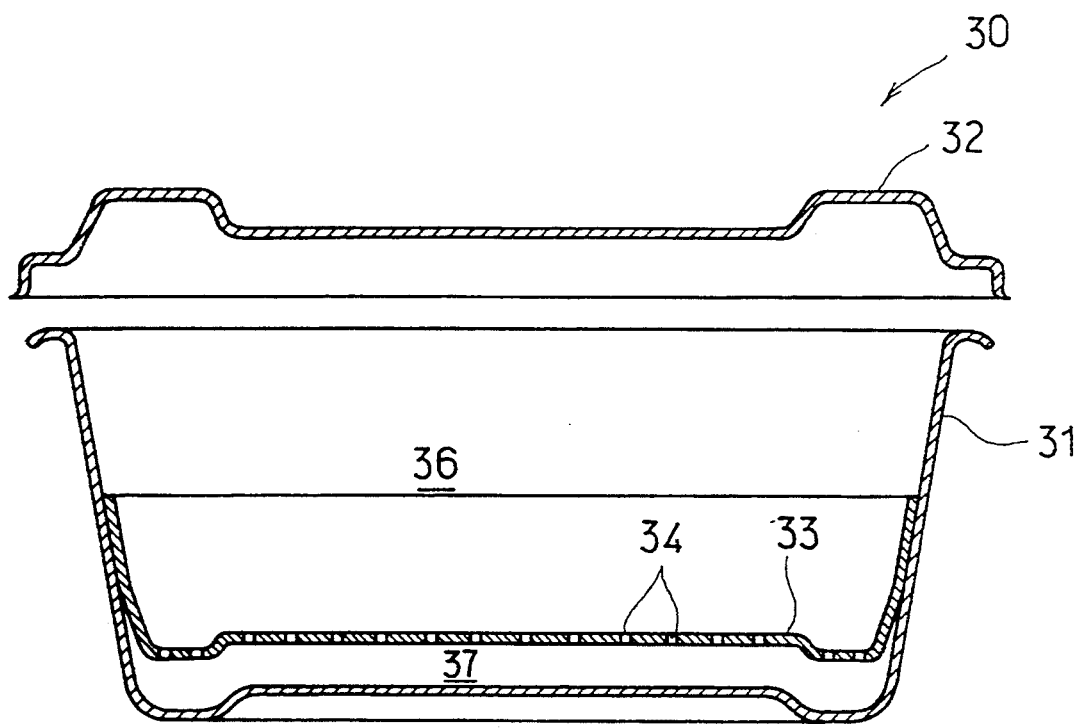

Next, containers for use in cooking the pressure-treated rice in a microwave oven will be described. FIG. 4 shows a container 30 comprising a container body 31 in the form of a bowl, a closure 32 for the container body and a partition 33 removaly provided in the container body. These members are made of various resin materials usable for the treatment in the microwave oven to be described below and free of problems as to food sanitation. Examples of such suitable materials are polypropylene, "EVAL" etc. The size of the container body 31 is so determined that the pressure-treated rice can be accommodated in the upper portion 36 thereof on the partition 33 in an amount required for the contemplated use. The upper portion of the present embodiment accommodates about 140 g of rice. The closure 32 is placed on the container body 31 to cover an upper opening thereof with such airtightness that the steam produced during cooking in the microwave oven can be held within the container while suitably releasing an increase in the internal pressure. The partition 33 is in the form of a shallow bowl and has a side wall which is so shaped as to be substantially in contact with the inner side surface of the container body 31. The bottom wall of the partition divides the interior of the container body into the upper portion 36 for accommodating the pressure-treated rice, and a lower portion 37 for containing water for steaming the rice. The bottom wall of the partition 33 is formed with a multiplicity of steam ports 34 for holding the upper portion 36 and the lower portion 37 in communication with each other therethrough. The lower portion 37 has the depth to be described below so as to accommodate an amount of water sufficient to steam the pressure-treated rice without making the container excessively bulky. When the container is adapted to contain 140 g of the treated rice like the present embodiment, the depth is preferably 2 to 15 mm, more preferably 5 to 8 mm.

Using the container and a microwave oven, the pressure-treated rice is cooked to a state suited to eating in the following manner. First, the partition is installed in the container body 31, and a suitable amount of the pressure-treated rice is placed into the body. Next, water is placed into the body in an amount slightly excessive relative to the rice, i.e., usually about 1.5 to about 1.6 times the amount of the rice. The higher the temperature of the water, the shorter will be the cooking time, whereas the water may have room temperature. The container is closed with the closure 32 and placed into the microwave oven, which is then operated. Although the operating time varies with the amount of treated rice and the output of the microwave oven, it is suitable to boil 140 g of the treated rice for about 5 to about 7 minutes and steam the rice for about 5 to 10 minutes, for example, when the microwave oven is for household use. The operation of the microwave oven first boils the water, boiling the pressure-treated rice. Since the treated rice has a large amount of water already contained therein, such a supply of water to the rice as is needed in this case for cooking usual rice is unnecessary. When the amount of water decreases below the partition 33 owing to boiling, the rice is steamed with water vapor. The arrangement wherein the peripheral edge of the partition 33 is in contact with the inner side surface of the container body 33 eliminates the likelihood that the steam will escape through a space between the partition and the container body and reach the top portion of the container without coming into contact with the rice. However, a clearance, if present between the partition and the container body, will not impair the substantial function of the present invention although somewhat lowering the efficiency of action of the steam and the uniformity of treatment in the interior of the container. This is also true of the following embodiments. Owing to the foregoing unique nature, the pressure-treated rice is cooked very satisfactorily by the boiling and steaming which are effected for the respective short periods of time already described.

Steam ports can be formed also in the side wall of the partition unlike the above partition. Further the partition may be fixed to the container wall.

Figure 5:
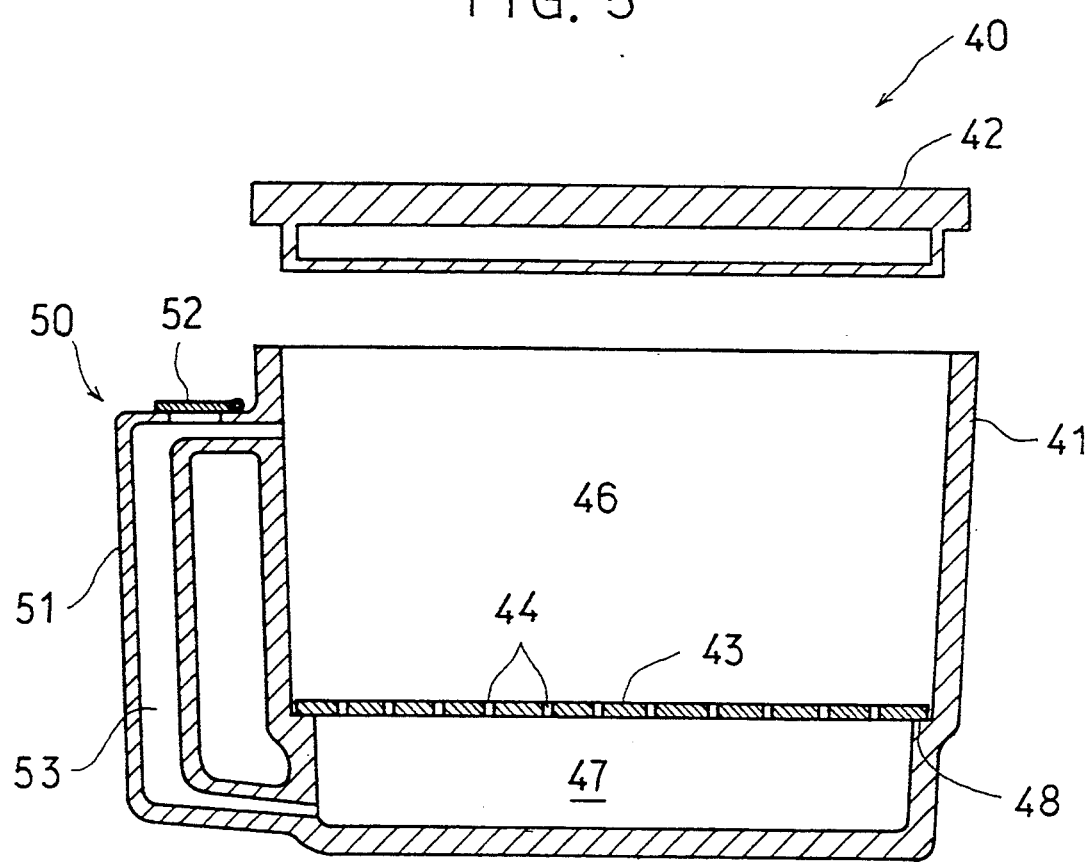

FIG. 5 shows another container embodying the present invention for use in cooking the pressure-treated rice. The container 40 comprises a container body 41, a stepped portion 48 formed on the inner surface of the side wall of the body and a partition 43 resting on the stepped portion 48. A handle-gauge portion 50 is provided on a side portion of the container body 41. The handle-gauge portion 50 comprises a U-shaped projection 51 projecting from the container body 41 radially outwardly thereof, and a valve 52 provided on the top of the projection 51. The projection 51 has a transparent or semitransparent portion which extends vertically and which is hollow. The top of the hollow portion 53 is positioned above the level of water to be contained in the container body 41, and the bottom of the portion 53 is positioned in the vicinity of the bottom of the container body 41. The hollow portion communicates at the top and the bottom with the interior of the container body. The valve 52 is hinged to the top wall of the projection 51 and openably covers a small hole 54 formed in the top wall. With the present embodiment, a closure 42 is tightly fittable in the opening of the container body 41.

The container 40 is used for cooking the pressure-treated rice also in the same manner as already described. The present embodiment is provided with the handle-gauge portion 50 having the transparent or semitransparent portion, so that the level of water in the handle-gauge portion 50 indicates the amount of water in the container even if the side wall of the container body is opaque. An increase in the vapor pressure during cooking is released through the valve 52. The construction wherein the bottom of the hollow portion 53 is positioned close to the bottom of the container body prevents steam from escaping through the hollow portion to the top portion of the container even if the level of water within the container is lower than the partition.

FIG. 6 shows another container embodying the present invention for use in cooking the pressure-treated rice. The container 60 comprises a container body 61, an outer closure 62, a partition 65 and an inner closure 66. The container body 61 is in the form of a bowl comprising a side wall 610 and a bottom wall 611. A flange 613 is formed around the outer periphery of the body 61 at a position a small distance below a top edge 612 defining an opening. A knob 614 is provided below the flange. A leg 615 extends downward from the lower surface of the bottom wall 611. The lid of the container comprises the outer closure 62 and the inner closure 66. The outer closure 62 comprises a side wall 620 fittable to the opening top edge 612 of the container body in intimage contact therewith, an upper wall 621 extending from the side wall to the central portion, a pressure control valve 630 provided on the upper wall centrally thereof, and fasteners 640 supported by the side wall 620. The upper wall 621 is formed with an annular recessed portion close to its center, and an annular ridge 623 is formed on the lower surface of the recessed portion. Steam ports 624 and 625 are formed in the recessed portion respectively on the inner side and the outer side of the ridge immediately adjacent thereto. The upper wall 621 has a central protrusion 626 formed with a hole 627 centrally thereof and steam ports 628 around the hole. The side wall 620 has two guide bores 629 extending therethrough and opposed to each other. The pressure control valve 630 comprises a stem 631 inserted through the hole 627 in the central protrusion of the outer closure, and a disk 632 extending radially from the upper end of the stem. The stem 631 is hollow and has a plurality of grooves 633 communicating with the hollow portion and extending axially of the stem. The stem 631 has opposite ends of an increased diameter for restricting the range of sliding movement of the stem in the hole 627. The fastener 640 comprises a slide portion 641 inserted through the guide bore 629 in the side wall 620, a vertical portion 642 extending downward from the slide portion, and an engaging portion 643 extending from the lower end of the vertical portion radially inwardly of the outer closure. The engaging portion 643 is so disposed as to engage with the flange 613 on the container body 61 when the slide portion 641 is pushed into the guide bore 629 after the outer closure 62 is fitted over the container body 61 with the slide portion 641 pulled out. The partition 65 comprises a side wall 650 and a bottom wall 651 and is in the form of a bowl. The bottom wall 651 is formed with a multiplicity of steam ports 652 and has legs 653 on its lower surface. The legs 653 serve to form a chamber between the partition and the bottom wall 611 of the container body for accommodating water for steaming the rice and have such a length that the chamber has the same depth as the corresponding chamber of the embodiment of FIG. 4. The top edge of the side wall 650 is provided with a flange 654. When the partition 65 is placed into the container body 61, the interior of the container body is divided into an upper portion and a lower portion by the bottom wall 651, with the flange in contact with the side wall 610 of the container body. The inner closure 66 comprises a side wall 660 supportable by the top wall 612 of the container body in contact with the inner surface thereof, and a bottom wall 661 extending from the lower end of the side wall. Steam ports 662 are formed in the bottom wall close to the outer periphery thereof. The central portion of the bottom wall is in the form of a protrusion 663 which is slightly raised. When the outer closure 62 is closed, the annular ridge 623 comes into contact with the peripheral edge portion of the protrusion 663. Steam ports 664 are formed also in the protrusion 663. The protrusion 663 is centrally formed with a knob 665 extending upward vertically.

The container 60 is used in the following manner. The partition 65 is installed in the container body 61, and the pressure-treated rice and water are placed therein. The inner closure 66 is placed over the partition, and the outer closure 62 is fitted over the closure 66, and is fastened to the container body by the fasteners 640. The container 60 in this state is placed into a microwave oven and heated. When the water in the container boils, the internal pressure of the container builds up, permitting steam to be released through the steam ports 662, 664 of the inner closure and through the steam ports 624, 625, 628 of the outer closure. Upon the increase in the pressure exceeding a certain value, the steam pressure lifts the pressure control valve 630, permitting the release of steam also through the grooves 633 to mitigate the pressure. Accordingly, the weight of the pressure control valve, when adjusted, makes it possible to heat the rice with the internal pressure of the container elevated to a desired value and to cook the rice more satisfactorily than under the usual pressure in a shortened period of time. When the steam liquefies between the outer closure 62 and the inner closure 66, the resulting water returns downward through the steam ports 662. With the present container, the contact of the top flange 654 of the partition 65 with the side wall 650 of the container body also obviates the likelihood that the steam will escape through a clearance between the partition and the container body to reach the top portion of the container without coming into contact with the pressure-treated rice. Instead of the flange 654, the top edge may be extended so as to contact the lower surface of the inner closure 66 as indicated in broken lines in FIG. 6. Since the bottom wall of the container body has the legs 615, the bottom surface of the container can also be irradiated with microwaves in the microwave oven.

I claim:

1. A method of preparing pressure-treated rice comprising the steps of placing washed polished rice directly into water within a pressure chamber and applying a high pressure to the pressure chamber, the pressure being not lower than 1,000 atm to not higher than 9,000 atm, said pressure being applied for a time sufficient to denature the rice and to produce a rice product having high hardness and which is more similar to uncooked polished rice than to cooked rice, said rice product being suitable for eating after being cooked for a short period of time.

2. A method according to claim 1 wherein the pressure is at least 2000 atmospheres.

3. A method according to claim 1 wherein the pressure is at least 4000 atmospheres.

4. A method according to claim 1 wherein said pressure is applied for 20–50 minutes.

5. A method according to claim 1 further comprising removing the pressure-treated rice from the pressure chamber and drying the removed rice.

* * * * *